United States Patent
Wanner et al.

(10) Patent No.: US 8,452,485 B2
(45) Date of Patent: May 28, 2013

(54) METHOD FOR PREPARING ERROR ENTRIES

(75) Inventors: Peter Wanner, Vaterstetten (DE); Alois Freistadt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1756 days.

(21) Appl. No.: 11/808,114

(22) Filed: Jun. 6, 2007

(65) Prior Publication Data

US 2007/0288137 A1 Dec. 13, 2007

Related U.S. Application Data

(63) Continuation of application No. PCT/EP2004/013885, filed on Dec. 7, 2004.

(51) Int. Cl.
*G07C 5/08* (2006.01)
*B60R 16/023* (2006.01)

(52) U.S. Cl.
USPC .............................................. 701/31.7

(58) Field of Classification Search
USPC ............................. 701/31.7; 714/31
See application file for complete search history.

(56) References Cited

U.S. PATENT DOCUMENTS

| | | | | |
|---|---|---|---|---|
| 4,041,470 A * | 8/1977 | Slane et al. | | 701/29.1 |
| 5,506,773 A * | 4/1996 | Takaba et al. | | 701/33.4 |
| 5,594,646 A * | 1/1997 | Itoh et al. | | 701/33.6 |
| 6,347,267 B1 * | 2/2002 | Murakami | | 701/29.7 |
| 6,925,581 B2 * | 8/2005 | Hommel | | 714/14 |
| 7,038,578 B2 * | 5/2006 | Will | | 340/439 |
| 7,310,746 B2 * | 12/2007 | Griessbach | | 714/18 |
| 7,500,151 B2 * | 3/2009 | Englert et al. | | 714/45 |
| 2004/0052208 A1 * | 3/2004 | Vollmer et al. | | 370/216 |

FOREIGN PATENT DOCUMENTS

| | | | |
|---|---|---|---|
| DE | 4040927 A1 | * | 6/1992 |
| DE | 4443218 A1 | * | 4/1996 |
| DE | 19948663 A1 | * | 5/2001 |
| DE | 101 07 367 A1 | | 9/2002 |
| DE | 10121061 A1 | * | 10/2002 |
| DE | 10301983 A1 | * | 7/2004 |
| EP | 631921 A2 | * | 1/1995 |
| FR | 2756050 A1 | * | 5/1998 |
| JP | 06269066 A | * | 9/1994 |
| JP | 2004302944 A | * | 10/2004 |

OTHER PUBLICATIONS

EPO machine translation of DE 4443218.*
Form PCT/ISA/237 including an English translation of the pertinent portions (Five (5) pages). (Jun. 15, 2007).

* cited by examiner

*Primary Examiner* — James Trammell
*Assistant Examiner* — David Testardi
(74) *Attorney, Agent, or Firm* — Crowell & Moring LLP

(57) ABSTRACT

A method for preparing error entries of the user of a data bus in a motor vehicle is provided. When an error is detected, the detecting user is put into an error state and outputs an error message to a second user, a request to prepare an error entry is output by the second user to the detecting user after receiving such an error message as a function of at least one predefined condition, and an error entry is instigated by the detecting user in case of receiving such a request.

12 Claims, 2 Drawing Sheets

METHOD FOR PREPARING ERROR ENTRIES

CROSS REFERENCE TO RELATED APPLICATIONS

This application is a continuation of PCT International Application No. PCT/EP2004/013885, filed Dec. 7, 2004, the entire disclosure of which is herein expressly incorporated by reference. This application is related to application Ser. No. 11/808,113 entitled "Method for Structured Storage of Error Entries", filed on even date herewith.

BACKGROUND AND SUMMARY OF THE INVENTION

The present invention relates to a method for preparing error entries of the users of a data bus in a motor vehicle.

Typical users of a data bus, in particular control units in a motor vehicle, have the capability of detecting errors of their own operation and/or errors of the output behavior, e.g., the transmission behavior, of other users of the data bus. Such errors may be of various types, for example, temporary or permanent, safety-critical or not safety-critical, service-relevant or not service-relevant. In this context, service-relevant errors are those whose occurrence typically causes a service action such as the replacement or the repair of a unit in a service station in case of correct detection.

Modern motor vehicles typically contain several dozen control units. When an error is detected at one user of a data bus, the user detecting the error typically instigates an error entry in an error memory independently of the type of error. This error entry may be entered by the detecting user itself in a local error memory or the detecting user may instigate another user to perform a corresponding error entry.

A very large quantity of error entries may accumulate in one or more error memories of a motor vehicle by instigating an error entry for each detected error independently of the type of error. These error entries are typically read out via a diagnostic system, for example, in a service station, during an error search, and a large number of error entries makes the targeted error search difficult. The large number of errors which are not service-relevant prevents the quick and simple discovery of service-relevant errors.

In addition, the hardware of an error memory is unnecessarily strained by the high number of write cycles due to an unnecessarily high occurrence of error entries. This may result in exceeding the number of write cycles provided in the specification of the hardware of the error memory and/or breakdown or malfunctions of the hardware of the error memory.

Modern diagnostic systems have the option of masking error entries as a function of specific criteria, such as their safety relevance, in order to identify safety-critical errors quickly and easily. However, depending on how the criteria are established specific errors can be incorrectly masked. For example, the service relevance of an error frequently may not be derived solely from the type of error. Instead, determining the service relevance frequently requires additional information, such as information on specific vehicle states at the time of the occurrence of the error or in the time following the occurrence of the error. Accordingly, masking depending on criteria of the type of error may result in error entries of service-relevant errors being overlooked.

German Patent Document No. DE 10107367 A1 discloses a method for diagnosing using error pattern detection with assignment of one or more error symptoms to a physical error. The error systems are situated in an error pattern, the error pattern is logically linked to one more matrices, and the matrices contain information about the error patterns of known physical errors. The method offers the possibility of avoiding repeated entries in an error memory as a result of repeatedly occurring errors by detecting the associated error pattern. However, this method requires a very high storage and computing outlay. In addition, errors of an error pattern not yet stored in the error memory, which are not service-relevant in certain circumstances, are entered in the error memory at least once.

Exemplary embodiments of present invention provide a simple method for preparing error entries of the users of a data bus in a motor vehicle, in which unnecessary error entries are avoided.

Exemplary embodiments of the present invention provide a method in which upon detecting a possibly service-relevant error, the detecting user is put in an error state and outputs an error message to a second user, upon which a request to prepare an error entry is output to the detecting user by the second user as a function of at least one predefined condition, preferably establishing a state in which the detected error is function-impairing, or the transition of the motor vehicle into such a state, and an error entry is instigated by the detecting user in case of receiving such a request.

By interposing the at least one condition checked by the second user, unnecessary error entries may be avoided.

According to an exemplary embodiment of the present invention, errors which are detected by one of the users are first assigned to at least one of two classes as a function of their error type. Depending on the error type and/or class, an error entry is then immediately instigated or a method as described above is used. Upon detection of an error of at least one first class, such as the class of safety-relevant and/or in any case service-relevant errors, an error entry is immediately instigated by the detecting user. Upon detection of an error of at least one second class, such as the class of errors which are not safety-relevant and only service-relevant under certain circumstances, the detecting user is put into an error state and an error message is output to a second user, upon which a request to prepare an error entry is output to the detecting user by the second user as a function of at least one condition and an error entry is instigated by the detecting user in case of receiving such a request.

By assigning the error to at least two classes, the possibility exists of storing errors of at least one specific class in any case, while errors of at least one other class may be checked more closely for the necessity and/or advisability of an error entry.

An error entry to be performed may be entered by the detecting user itself in a local error memory or the detecting user may instigate another user to perform a corresponding error entry. For example, instigating an error entry in a central error memory or instigating an error entry in the error memory of a user which is closer to the error source in a hierarchical structure than the detecting user is conceivable for this purpose.

Both the error detection and also performing error entries may be cascaded. For example, a user A, which has detected an error, may put itself in an error state and output an error message to a user B, the user B has thus also detected the error, puts itself in an error state and outputs an error message to a user C, the user C then outputs a request to prepare an error entry to the user B after receiving the error message as a function of at least one predefined condition, the user B outputs a request to prepare an error entry to the user A as a function of a predefined condition, namely receiving the request of the user C, upon which the user A performs the error entry.

A method according to the present invention is particularly suitable for use in a hierarchical structure of users. If a method according to the present invention is used in a function-related hierarchical structure, for example, a higher-order user typically decides whether a lower-order user is to perform or instigate an error entry.

A user which detects an error, transmits an error message, and has put itself in an error state typically initially remains in this error state. This error state may be connected to restrictions of the function of the user and is not to be maintained for an unnecessarily long time. An efficient procedure to cancel the error state as soon as possible, but not too early, is to cancel the error state after the expiration of a predefined time constant, during which the detecting user is in the error state, but has not received a request for error storage. It may also be expedient to cancel the error state after the occurrence of at least one predefined event. In particular, such an event may comprise the cessation of the error which has resulted in the transition into the error state, the detection of such a cessation, or a request not to enter the error being received. According to an advantageous embodiment of the present invention, an error state of a detecting user is thus canceled after the expiration of a predefined time constant without receiving a request to instigate an error entry and/or after the occurrence of at least one predefined event, in particular the cessation of the error.

To avoid synchronization problems when a cancellation of the error state triggered by an event, the error state can be canceled at the earliest after the expiration of a predefined time constant which is to be measured from the cessation, its establishment, and/or another event.

A further advantage of a method according to the present invention is that the efficient control of the storage of error entries may also be used for efficiently controlling warning notifications to the driver of the motor vehicle. It is also true for warning notifications to the driver, as for the storage of error entries, that as much as possible only safety-relevant and service-relevant errors are to be displayed. Correspondingly, according to a refinement of the present invention, a warning notification is immediately instigated upon occurrence of an error of a specific class, e.g., a safety-relevant error. In contrast, upon occurrence of an error of another class, e.g., an error which is not safety-relevant and only possibly service-relevant, a warning notification is only, and at earliest, output when one of the users outputs a request or an instigation for an error entry.

According to an exemplary embodiment of the present invention, such a warning notification is instigated by the user who outputs the request to prepare an error entry quasi-simultaneously with the output of the request.

Other objects, advantages and novel features of the present invention will become apparent from the following detailed description of the invention when considered in conjunction with the accompanying drawings.

DETAILED DESCRIPTION OF THE DRAWINGS

Figure 1:
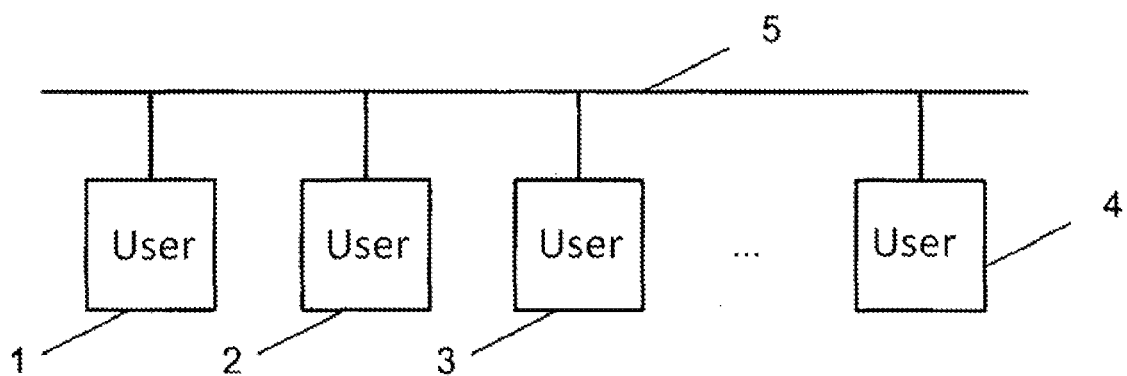
FIG. 1 schematically shows a data bus in a motor vehicle having multiple users.

A data bus 5 having multiple users 1, 2, 3, 4, etc. in a motor vehicle is schematically illustrated in FIG. 1.

Figure 2:
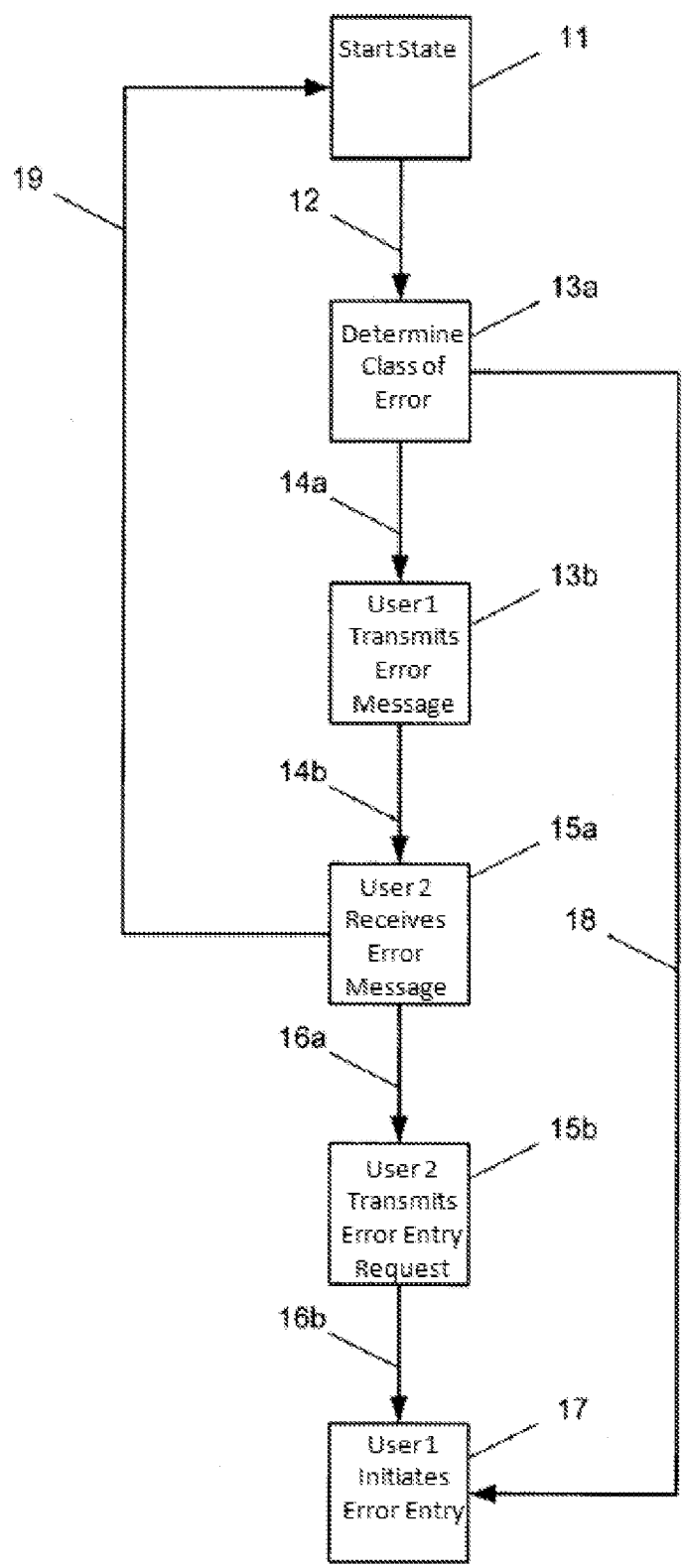
FIG. 2 shows the communication sequence in a method according to the present invention with the participation of two users.

FIG. 2 shows the communication sequence in a method according to the present invention with the participation of two users 1 and 2 of the data bus from FIG. 1. User 1 is hierarchically lower-order in regard to the function than user 2.

In the starting state 11, user 1 is not in an error state, and the error memory of the user 1 is empty.

A state transition 12 into a state 13a occurs when user 1 detects an error. In the case of the example, the error comprises not receiving an expected message of another user.

In the state 13a, user 1 determines the class of such an error and the error is assigned to one of two classes. Error class 1 comprises safety-relevant errors and errors which are service-relevant in any case. Error class 2 comprises errors which are not safety-relevant and are service-relevant only under certain circumstances. User 1 assigns the error detected in the example to error class 2. This results in the state transition 14a into the state 13b.

Accompanying the state transition 14a, user 1 transmits an error message to the user 2, which is hierarchically lower-order thereto in regard to this function. The error message contains various information on the detected error, e.g., the error type "missing message of a sensor," the time of the error detection, and the error source. In addition, user 1 puts itself in an error state by setting a corresponding data bit.

In the state 13b, user 1 has transmitted the error message, but user 2 has not yet received it. The receipt of the error message by user 2 results in the state transition 14b to the state 15a.

In the state 15a, user 2 has received the error message of the user 1 and decides on the basis of at least one predefined condition whether a request for preparing an error entry is to be output to the detecting user or whether a request is to be output to the detecting user to cancel the error state again. In the case of the example, a request to prepare an error entry is only to be output to the detecting user when a function in which the user 1 has participated is identified as activatable on the basis of a vehicle state, the travel velocity here, and the driver of the vehicle attempts within a predefined time constant, 60 seconds here, to activate this function. Otherwise, a request is to be output to the detecting user to cancel the error state again. A timer is started upon the transition into the state 15a to equalize a time span passed up to the time of an attempt at activation undertaken by the driver of the motor vehicle with the predefined time constant.

The state transition 16a is triggered after a time span which is less than the predefined time constant by an attempt of the driver of the motor vehicle to activate a function in which the user 1 participates and which is identified as activatable on the basis of the travel velocity.

Accompanying the state transition 16a, user 2 transmits a request to prepare an error entry to the user 1 and instigates the output of a warning notification to the driver of the motor vehicle.

In the state 15b, user 2 has transmitted the request, but user 1 has not yet received it. The receipt of the request by user 1 results in the state transition 16b into the state 17.

In the state 17, user 1 performs an error entry in the error memory.

If user 1 had assigned the detected error to the error class 1 in the state 13, an immediate state transition 18 into the state 17 and the immediate instigate of a warning instruction to the driver of the motor vehicle would have been the consequence. This would be the case, for example, in the event of an error of the error type "component X defective."

If the time constant passes in the state 15a without an attempt by the driver of the motor vehicle to activate a function in which the user 1 participates and which is identified as activatable on the basis of the travel velocity, the state transition 19 is thus triggered. The error state of the user 1 is canceled again and the error memory of the user 1 remains empty. The user 1 is thus again in the starting state 11.

According to a further exemplary embodiment (not shown here), the request to perform an error entry received by the user 1 from the user 2 is relayed by the user 1 to a user 3, which is hierarchically lower-order than the user 1 in regard to this function. This is advisable in particular if it is known at the user 1 that user 3 represents the error source or is at least closer to the error source in a hierarchy of the users than user 1.

According to a further exemplary embodiment (not shown here), the request to perform an error entry received by the user 1 from the user 2 is relayed by the user 1 to a user 3 equipped with a central error memory.

According to a further exemplary embodiment (not shown here), the error message received by the user 2 from the user 1 is relayed to a user 4 which is hierarchically higher-order in regard to the function than the user 2. User 2 is thus also put into an error state according to this exemplary embodiment. A request to instigate an error entry which user 2 received from user 4 is relayed to user 1. Jointly with such a request, or independently thereof, user 4 communicates to the lower-order users which error states are to be maintained or canceled.

An expansion of the error messages transmitted according to the present invention and requests for additional content such as error parameters, specifications on users possibly and/or actually functionally-impaired by the error, and action instructions are also in consideration and within the scope of the present invention.

The application of a method according to the present invention results in exclusively safety-relevant and/or service-relevant errors being entered in an error memory. The error search in a service station is thus significantly simplified and accelerated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising the acts of:
   placing a detecting control unit, upon detection of an error, into an error state and outputting an error message to a second control unit;
   receiving, by the second control unit, the error message, and determining, based on at least one predefined condition, whether to request the detecting control unit to prepare an error entry or cancel the error state;
   wherein when it is determined, by the second control unit, based on the at least one predefined condition, to request the detecting control unit to prepare an error entry, the second control unit outputs the request to prepare an error entry to the detecting control unit, the detecting control unit receives the request to prepare the error entry and the detecting control unit initiates entry of the error into a memory, wherein the entry of the error into the memory is performed by the detecting control unit or a third control unit,
   wherein when it is determined by the second control unit, based on the at least one predefined condition, to cancel the error state, the error state of the detecting control unit is canceled, and
   wherein the detecting, second, and third control units are connected to a data bus in a motor vehicle.

2. The method according to claim 1, wherein errors which are detected by one of the control units are assigned to one of at least two classes, and upon detecting an error of a specific class, the detecting control unit immediately instigates an error entry.

3. The method according to claim 1, wherein the detecting control unit enters the error into a local error memory.

4. The method according to claim 1, wherein the detecting control unit forwards the request to prepare the error entry to the third control unit, which enters the error into the memory.

5. The method according to claim 4, wherein the detecting control unit is higher-order than the third control unit in a hierarchical structure.

6. The method according to claim 1, wherein the detecting control unit is lower-order than the second control unit in a hierarchical structure.

7. The method according to claim 1, wherein an error state of the detecting control unit is canceled after the expiration of a predefined time constant without receiving a request of the second control unit or after the occurrence of at least one predefined event, in particular the cessation of the error.

8. The method according to claim 1, wherein a warning instruction is output to a driver of the motor vehicle no earlier than the output of the request to prepare the error entry.

9. The method according to claim 8, wherein the second control unit initiates output of the warning instruction simultaneously with the output of the request to prepare an error entry.

10. The method according to claim 1, wherein the error message is output to the second control unit via a fourth control unit and the fourth control unit is placed in an error state.

11. The method according to claim 10, wherein the detecting control unit receives the request to prepare the error entry from the second control unit via the fourth control unit.

12. The method according to claim 1, wherein the error message output to the second control unit includes a time of occurrence of the error.

\* \* \* \* \*